L. A. BIXBY.
WHEEL AND TIRE CARRIER.
APPLICATION FILED FEB. 15, 1919.

1,307,181.

Patented June 17, 1919.

Inventor
Leo A. Bixby
By Edwin Guthrie.
Attorney

UNITED STATES PATENT OFFICE.

LEO A. BIXBY, OF KALAMAZOO, MICHIGAN.

WHEEL AND TIRE CARRIER.

1,307,181.

Specification of Letters Patent. Patented June 17, 1919.

Application filed February 15, 1919. Serial No. 277,136.

*To all whom it may concern:*

Be it known that I, LEO A. BIXBY, citizen of the United States residing at Kalamazoo, in the county of Kalamazoo and State of Michigan, have invented certain new and useful Improvements in Wheel and Tire Carriers, of which the following is a specification.

This invention relates to tire and wheel carriers, and belongs to that class of appurtenances applied to automobile vehicles for the purpose of supporting and retaining extra wheels, rims or tires for use in emergencies.

It is an object of this invention to produce a carrier of nature stated comprising parts of special construction and arrangement with respect to each other and including a suitably supported swinging bar provided with means for carrying on either side a tire or wheel, or more than one on either side. By reason of the swinging arrangement of the bar the tire that is carried next to the frame of the vehicle may be conveniently removed without disturbing the tire or wheel upon the other side of the bar.

Figure 1:
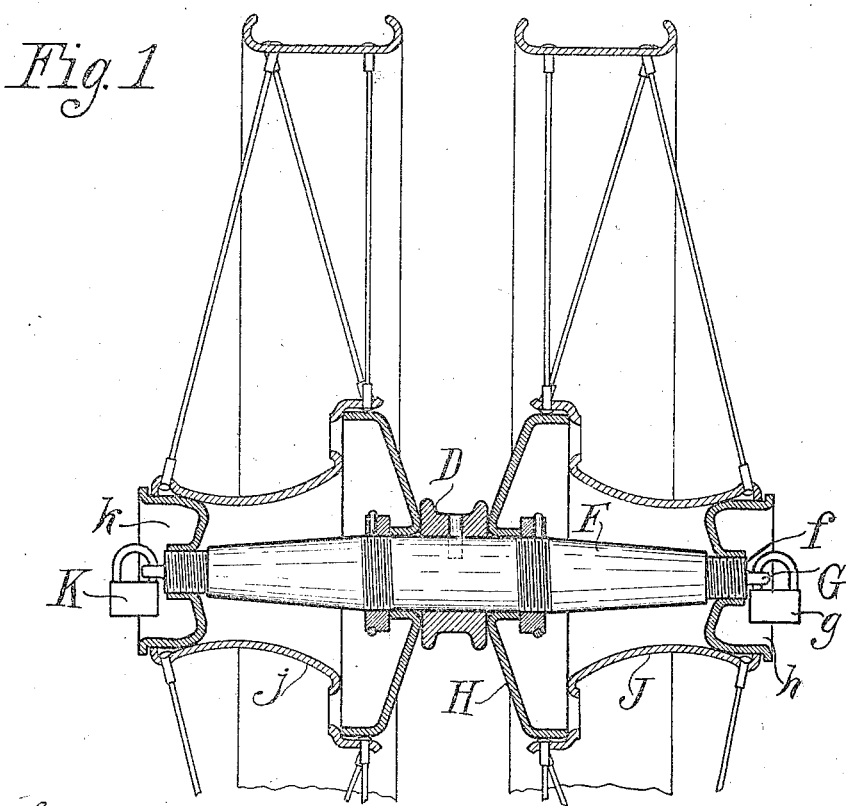
Figure 2:
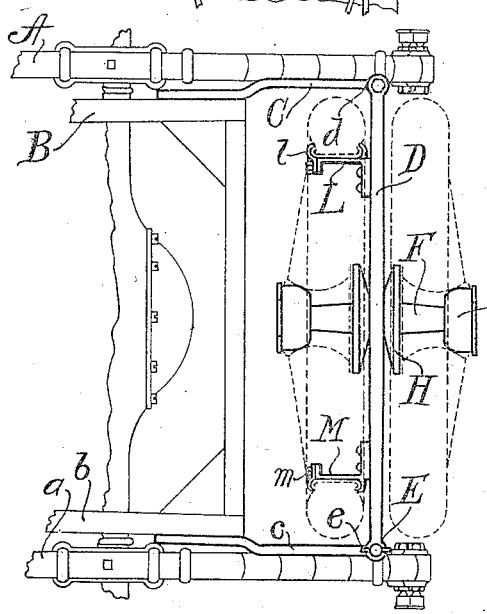

The accompanying drawings illustrate the construction and arrangement of the parts of this invention. Figure 1 of the drawings represents a cross-section of the bar and of the dished hub-holding cups and nuts, and the locking devices for securing the removable nuts. In this figure wheels are shown on either side of the bar supported as intended by this invention, and the wheels are likewise in section taken vertically through the axes of the hubs. Fig. 2 is a top plan view of the rear portion of the frame of an automobile vehicle, on a somewhat reduced scale of drawing, showing this invention applied thereto, and indicating by broken lines the positions of the wheels or tires at the sides of the swinging bar.

Throughout the description and drawings, the same letter is employed to refer to the same part.

Considering the drawings, the letters A and *a* mark the rear springs of an automobile, and B and *b* the side pieces of the frame thereof. Arms C and *c* are borne by and spaced apart by the frame. To one of the arms the swing, transverse bar D has one end *d* pivotally connected, while the other or free end E of the bar D is releasably secured to the other arm *c* by means of the removable pin *e*. It is not intended to limit this invention to the pin and eye construction for securing the free end of the bar D, as those features may obviously be replaced by other well known devices.

The middle of the bar D is pierced by the stationary shaft F, and the threaded end of the shaft designated by the letter *f* is usually provided with an eye G for engaging the hasp of the padlock *g*, which will be further mentioned.

Upon the shaft next to the bar D is arranged the hub-holding dished cup H, and the shaft is provided upon the other side of the bar with a similar cup as shown. A removable nut *h*, usually of the dished or cupped formation illustrated, engages the threaded end *f* of the shaft F. It will be now observed in Fig. 1 that the padlock must be removed before the nut can be taken off, and that when the nut has been removed the hub J may also be removed. It will further be noted that the nut *h* and cup H not only support the hub of the wheel but also retain it in place. The hub *j* of the other wheel set forth in Fig. 1, is similarly retained by the nut *k* secured by the second padlock K. The dished construction of the cup H and nut *h* tend to economy of manufacture and a saving of weight of metal but has no other particular significance herein, and the peculiar shape may be departed from.

In practice, the bar D may be supplied, as illustrated in Fig. 2, with the brackets L and M for engaging and holding a removable wheel rim, or a tire by itself. A wheel might in like manner be held by the brackets L and M. These bracket fixtures L and M, have removable portions *l* and *m* in order that tires may be placed in position thereon and suitably retained by replacing such removable parts.

In explaining the mode of operation of this invention, attention is called to the fact that the bar D swings toward and from the frame of the vehicle. Thus, one of the carried wheels would lie between the bar and the end of the frame as indicated in Fig. 2. If that particular wheel or tire was wanted, the pin *e* would be withdrawn enabling the bar to be swung outwardly to a sufficient extent as to allow the removal of the wheel from the stationary shaft F. The same is true if the wheel or tire were held upon the bracket supports L and M.

Having now described this invention, and explained the mode of its operation, what I claim is:—

1. In a wheel carrier, the combination with a vehicle frame, of a single swinging bar having one end pivotally connected with the frame and the other end having a releasable connection with said frame, and means attached to the middle of the swinging bar and projecting upon both sides thereof for securing wheels on either side of the said bar.

2. In a wheel carrier, the combination with supporting arms spaced apart, of a swinging bar having a pivotal connection at one end with one of said arms and a releasable connection at the other end with the other supporting arm, a stationary shaft borne by the said bar and projecting at the sides thereof, and means for supporting and retaining the hubs of wheels upon the projecting portions of the said shaft.

3. In a wheel carrier, the combination with supporting arms spaced apart, of a swinging bar having a pivotal connection at one end with one of said arms and a releasable connection at the other end with the other supporting arm, a stationary shaft borne by the said bar and projecting at the sides thereof, and means including removable portions for supporting and retaining the hubs of wheels upon the projecting portions of the said shaft.

4. In a wheel carrier, the combination with supporting arms spaced apart, of a swinging bar having a pivotal connection at one end with one of the said arms and a releasable connection at the other end with the other supporting arm, a stationary shaft borne by the said bar and projecting at the sides thereof, removable means for supporting and retaining the hubs of wheels upon the said shaft, and locking devices constructed to fasten the said hub-supporting means in position.

5. In a wheel carrier the combination with supporting arms spaced apart, of a swinging bar having a pivotal connection at one end with one of the said arms and a releasable connection at the other end with the other supporting arm, a stationary shaft borne by the said bar and projecting at the sides thereof, means arranged upon the projecting portions of the said shaft for supporting and retaining the hubs of wheels on the shaft, the said hub-supporting means having a removable member to permit the removal of the hub, and locking devices for securing the said removable member.

6. In a wheel and tire carrier, the combination with a vehicle frame, of a single swinging bar having one end pivotally connected with the frame and the other end having a releasable connection with the said frame, and means borne by the bar and projecting on both sides thereof whereby wheels and tires are supported solely by the bar.

In testimony whereof I affix my signature.

LEO A. BIXBY.